(12) United States Patent
O'Bireck et al.

(10) Patent No.: US 7,722,066 B2
(45) Date of Patent: May 25, 2010

(54) VEHICLE OPERATION ASSEMBLY

(75) Inventors: John Thomas O'Bireck, Aurora (CA); Luka Debravko Leko, Mississauga (CA); John E. Doughty, Grand Valley (CA); John Charles Muir, Hamilton (CA)

(73) Assignee: Hy-Drive Technologies Ltd., Mississauga (CA)

( * ) Notice: Subject to any disclaimer, the term of this patent is extended or adjusted under 35 U.S.C. 154(b) by 930 days.

(21) Appl. No.: 11/460,767

(22) Filed: Jul. 28, 2006

(65) Prior Publication Data

US 2007/0151778 A1 Jul. 5, 2007

Related U.S. Application Data

(60) Provisional application No. 60/595,746, filed on Aug. 2, 2005.

(30) Foreign Application Priority Data

Jan. 27, 2006 (CA) .................................. 2534420
Mar. 8, 2006 (CA) .................................. 2538922

(51) Int. Cl.
*B60R 3/00* (2006.01)
(52) U.S. Cl. ..................... 280/164.1; 280/163; 280/848
(58) Field of Classification Search ............. 180/65.22, 180/68.5, 300, 301; 280/163, 164.1, 848; 204/242, 267, 285, 263; 123/3, DIG. 12
See application file for complete search history.

(56) References Cited

U.S. PATENT DOCUMENTS

| | | | |
|---|---|---|---|
| 1,775,754 A | 9/1930 | Fageol | |
| 4,074,786 A * | 2/1978 | Joubert | 180/68.5 |
| 4,368,696 A | 1/1983 | Reinhardt | |
| 4,573,435 A | 3/1986 | Shelton | |
| 5,009,752 A * | 4/1991 | Tomczuk et al. | 205/44 |
| 5,143,025 A * | 9/1992 | Munday | 123/3 |
| 5,231,954 A * | 8/1993 | Stowe | 123/3 |
| 5,419,981 A * | 5/1995 | Golben | 429/37 |
| 5,462,021 A | 10/1995 | Minami et al. | |
| 5,879,522 A * | 3/1999 | Shaaban et al. | 204/263 |
| 6,209,493 B1 | 4/2001 | Ross | |
| 6,347,678 B1 * | 2/2002 | Osborn et al. | 180/68.5 |
| 6,866,756 B2 * | 3/2005 | Klein | 204/268 |
| 6,971,657 B2 * | 12/2005 | King et al. | 280/163 |
| 6,979,913 B2 * | 12/2005 | Storm et al. | 180/65.22 |
| 7,034,410 B2 * | 4/2006 | Kennedy | 290/1 A |
| 7,143,722 B2 * | 12/2006 | Ross | 123/3 |
| 2002/0179454 A1 | 12/2002 | Ross | |
| 2003/0070850 A1 | 4/2003 | Reid et al. | |
| 2004/0025807 A1 * | 2/2004 | Jhetham | 123/3 |
| 2004/0146754 A1 | 7/2004 | Arthur et al. | |
| 2004/0262059 A1 | 12/2004 | Uozumi | |
| 2005/0045391 A1 | 3/2005 | Kubusch et al. | |

* cited by examiner

*Primary Examiner*—Hau V Phan
(74) *Attorney, Agent, or Firm*—Bennett Jones LLP

(57) ABSTRACT

A vehicle operation assembly comprising: stairs including a step; and a vehicle operation system positioned behind the stairs such that the step of the stairs is exposed for use in front of the vehicle operation system, the stairs being adapted to permit access to the vehicle operation system. The vehicle operation system may include a sleeper cab heater, a hydraulic system, a diesel generator, or a fuel supplement system such as a hydrogen generating system.

20 Claims, 5 Drawing Sheets

US 7,722,066 B2

VEHICLE OPERATION ASSEMBLY

FIELD OF THE INVENTION

The present invention is directed to a vehicle operation assembly.

BACKGROUND

Transport trucks have limited available space for vehicle operation systems and equipment. While it would be desirable to provide various vehicle operational systems on a transport truck, space limitations often restrict the optional equipment that can be installed thereon. As such, many vehicle operation systems that are optional are eliminated in favor of allotting space to more critical vehicle operation systems. Some vehicle operation systems include, for example, sleeper compartment heaters, hydraulic power packs, diesel generators, and fuel supplement systems, such as hydrogen generating apparatus.

Hydrogen generating apparatus have been used on motor vehicles to supplement the fuel used to drive the vehicle. The use of hydrogen as a supplemental fuel in motor vehicle engines has been proposed to increase the performance of the engine. Hydrogen and oxygen, when used as part of the air/fuel mixture for the operation of the engine, have been found to increase the performance of the engine by increasing the mileage and by reducing the amount of emissions from the engine. The hydrogen and oxygen may be generated through electrolysis of an aqueous solution with the gases given off being mixed with the charge of fuel and air supplied to the engine.

Although hydrogen generating apparatus have proven useful, some vehicles such as larger trucks simply don't have the room to accommodate the apparatus. This disadvantage has limited the widespread acceptance of hydrogen generating apparatus.

SUMMARY OF THE INVENTION

In accordance with a broad aspect of the present invention, there is provided vehicle operation assembly comprising: stairs including a step; and a vehicle operation system positioned behind the stairs such that the step of the stairs is exposed for use in front of the vehicle operation system, the stairs being adapted to permit access to the vehicle operation system.

In accordance with another broad aspect of the present invention, there is provided a hydrogen generating apparatus comprising: a hydrogen generating cell forming a lower portion of the apparatus; an auxiliary device mounted above the hydrogen generating cell and along one side of the apparatus; an open area above the hydrogen generating cells alongside the auxiliary device, the open area being substantially free of any auxiliary devices mounted thereon; and a housing about the hydrogen generating cell, the auxiliary device and the open area, the housing extending over the auxiliary device and extending down to cover the open area such that the housing defines a first height over the open area and a second height over the auxiliary device, the first height being less than the second height.

In accordance with another broad aspect of the present invention, there is provided a hydrogen generating assembly comprising: stairs including a step; and a hydrogen generating apparatus positioned behind the stairs such that the step of the stairs is exposed for use in front of the hydrogen generating apparatus, the stairs being adapted to permit access to the hydrogen generating apparatus.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

According to the present invention, a vehicle operation system may be formed and configured to permit it to be mounted behind and possibly integrated with the stairs on a vehicle such as a transport truck. A vehicle operation system may include at least some optional or critical active vehicle operational components, such as, for example, any of a sleeper compartment heater, a hydraulic power pack, a diesel generator, or a fuel supplement system, positioned behind, which may also be considered as "under", a vehicle's stairs so that the stairs remain open and operational for their normal purpose to access the cab or other components of the vehicle, but the space beneath the stairs, becomes useful for housing at least some active components of the vehicle operation system.

Figure 1:
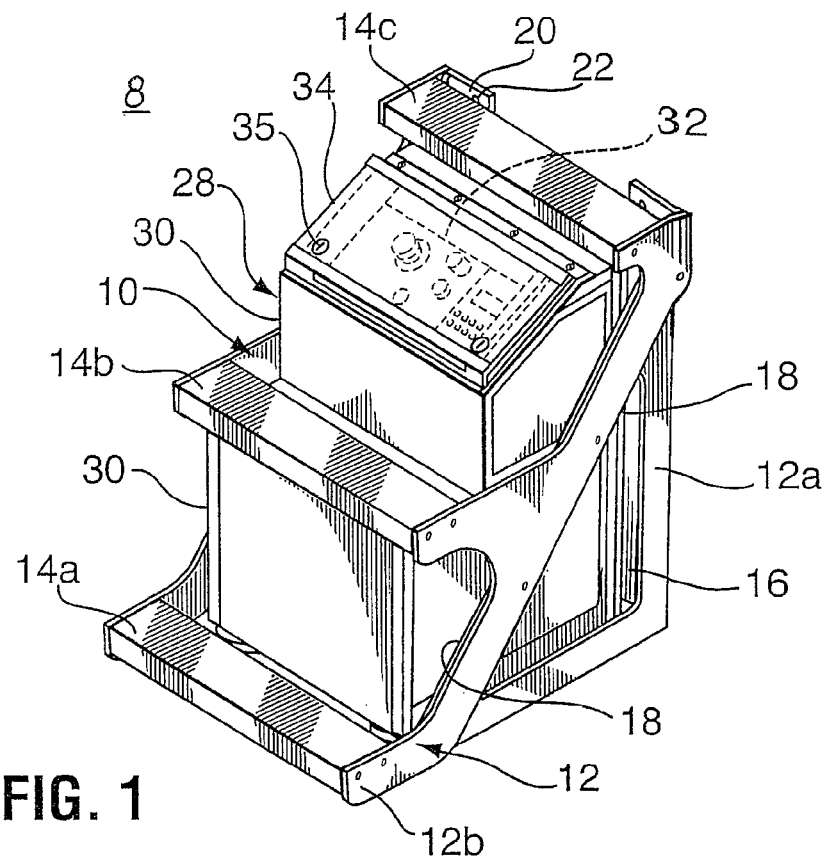
FIG. 1 is a perspective view of a transport truck vehicle operation assembly according to one aspect of the present invention.
Figures 2, 3:
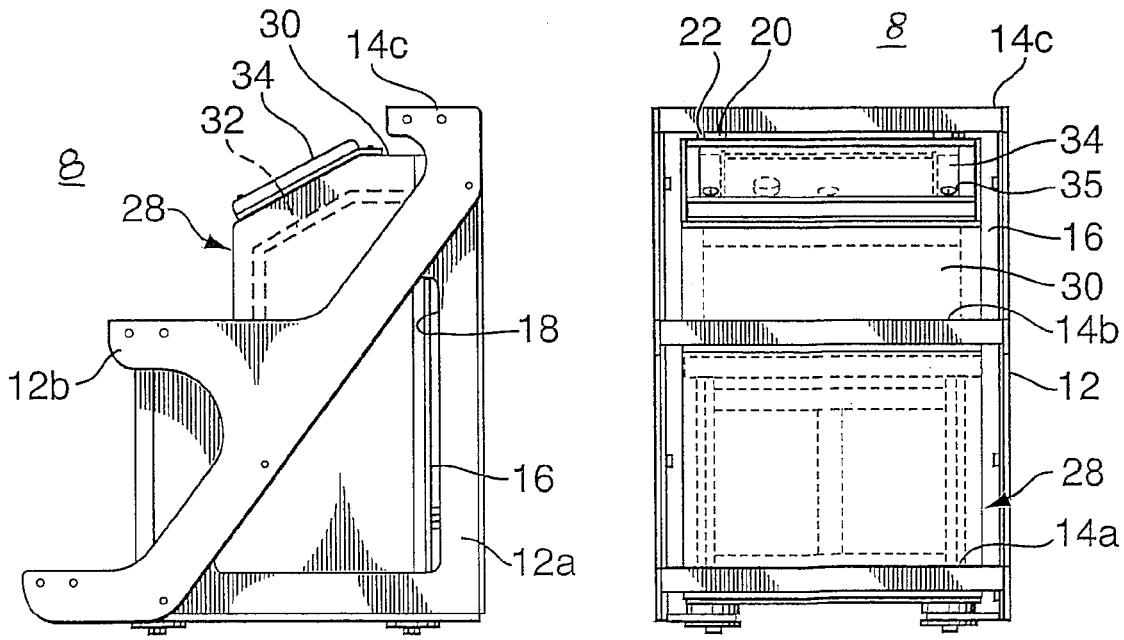
FIG. 2 is a side elevation of the assembly of FIG. 1.
FIG. 3 is a front elevation of the assembly of FIG. 1.

One possible vehicle operation assembly according to the present invention is illustrated in FIGS. 1 to 3. The assembly 8 includes vehicle stairs 10 including at least one step and in this embodiment a support frame 12. In the illustrated embodiment, the stairs include three steps including a lower step 14a, a middle step 14b and an upper step 14c. Vehicle stairs may also be termed a "ladder", but in any event include at least one step.

The stairs may be formed to define an open area 16 behind the steps. Support frame 12 and the steps may be formed to fill in about and substantially enclose open area 16 or, as shown, support frame 12 and the steps may include openings 18 therebetween so that the open area may be accessed through the front and/or side of the stairs.

Support frame 12 may include mounting flanges 20, apertures 22, etc. to permit stairs 10 to be secured to the vehicle.

The stairs may be constructed for their intended purpose so that they are durable and formed of appropriate materials such as of durable plastic, aluminum, steel, chromed materials, etc. formed by molding, casting, welding, fastening, or various other means.

The size and shape of the stairs will depend on the desired distance between the steps, the number of steps, etc. and, thus, as will be appreciated, the stairs may vary in size and appearance as well as construction.

Assembly 8 further comprises a vehicle operation system 28, which may include at least some active components of a hydrogen generating apparatus, another type of fuel supplement system, a sleeper compartment heater, a hydraulic power pack or a diesel generator, etc. System 28 may be positioned in open area 16 defined behind the steps of the stairs. Generally, it will be required to access the system, for example for maintenance, control, actuation, etc. Thus, the stairs may be adapted to permit access to system 28. For example, the stairs may be adapted to be firmly installed but removable from over the system, so that it can be accessed if need be by removal of the stairs, through openings above, below or between steps or at the sides.

System 28 may, in one embodiment, include a housing 30 including a cover 34 positioned over an operation panel 32 (shown in phantom behind cover 34) through which at least some active components of the system are accessible for maintenance and control thereof. In the illustrated embodiment, the housing is formed to fit into the shape defined behind the steps 14a, 14b, 14c with the operation panel exposed for access through an opening 18 between the steps of the stairs. In this illustrated embodiment of FIGS. 1 to 3, operation panel 32 of the system is accessible by opening its cover 34, which is positioned between two steps: middle step 14b and upper step 14c. As such, the operation panel is readily accessible on the front of the stairs, which is generally unobstructed on the vehicle.

Housing 30 may be formed to protect at least some active components of the system. For example, housing 30 may be formed of durable materials that protect against damage by kicking, weather and the rigors of being open on the side of a motor vehicle such as a transport truck. Housing 30 may also be formed to support the weight of a person standing thereon as may occur during use of the stairs by a person. In the illustrated embodiment, for example, the housing is formed to accommodate stepping thereon since the proximity and position of housing 30 to upper stair 14c may present a surface on which the operator may step. In one embodiment, for example, not shown the housing of the system may become integral with the stairs so that at least a portion of the system housing acts as at least a portion of a step and/or a support frame. Such an embodiment is described below with respect to FIG. 4.

Operation panel 32 may include locks, control buttons, fill ports, etc. as may be desired for operations such as filling, accessing, inspecting, controlling, actuating, etc. the system. Cover 34 may include locks 35, etc. to restrict unauthorized access to the operation panel, if desired.

In the assembly, the stairs may be permanently or removably mounted over the system. In one embodiment, the stairs are removably mounted over the system by removable fasteners. For example in the illustrated embodiment, support frame 12 includes a rear frame 12a on which system 28 is mounted and a portion 12b of the support frame having the steps 14a, 14b, 14c attached thereto is removably mounted by removable fasteners to the rear frame with housing 30 positioned therebetween. With this construction, support frame portion 12b including the steps can be removed from its position over the housing to facilitate access to the vehicle operation system and/or to permit removal of the system from behind the stairs. Of course, for removable mounting other fasteners may alternately be used, such as hinges, pivots, latches, catches, locks, etc., as desired.

Figure 4:
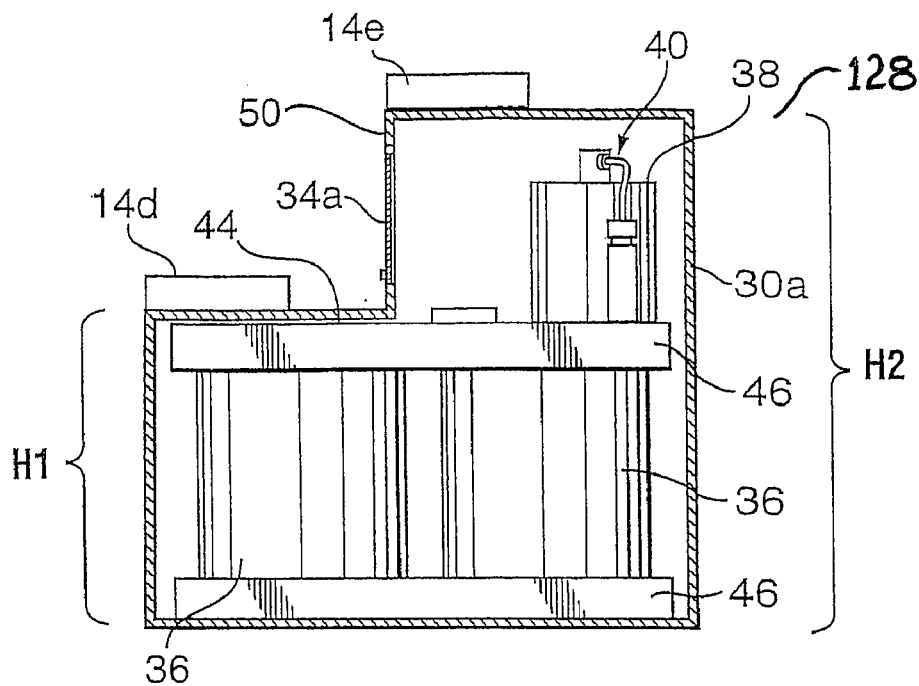
FIG. 4 is a schematic sectional view through a hydrogen generating apparatus according to the present invention.
Figure 5A:
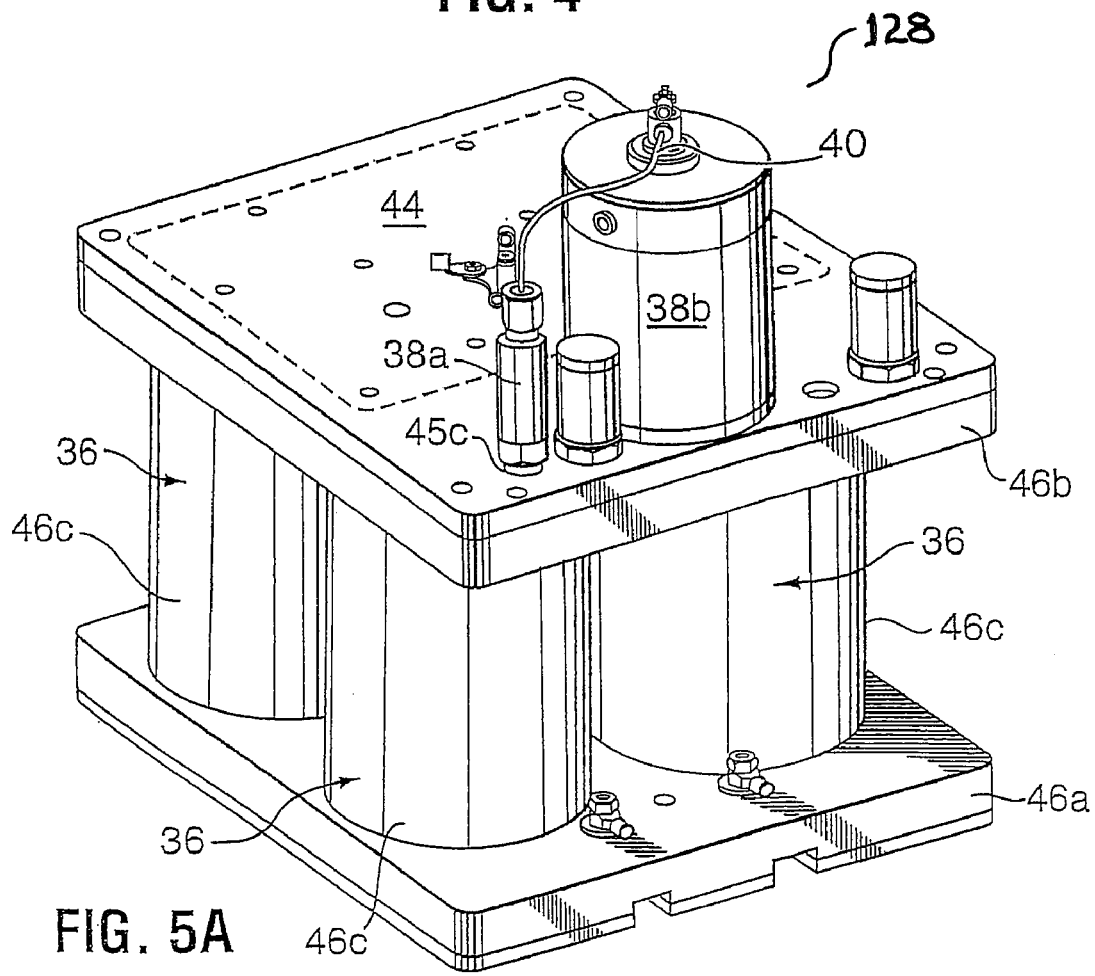
FIG. 5A is a perspective view of a hydrogen generating apparatus with its housing removed.
Figure 5B:
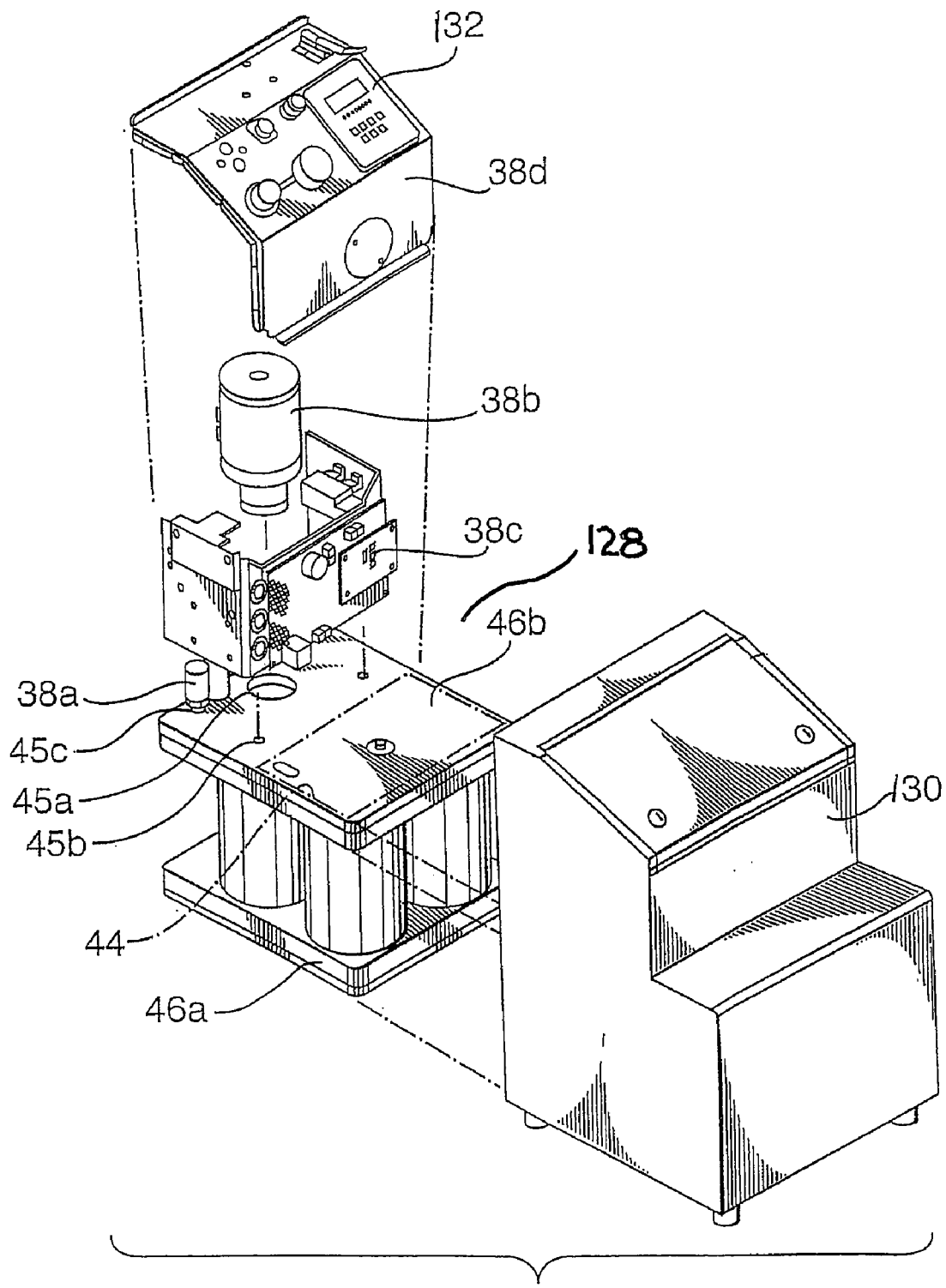
FIG. 5B is an exploded perspective view of a hydrogen generating apparatus according to the present invention.

With reference to FIGS. 4 and 5A and 5B, assemblies according to the present invention are shown wherein their vehicle operation systems each include a hydrogen generating apparatus 128. To reduce the size of an assembly including a hydrogen generating apparatus, the hydrogen generating apparatus may be internally sized and configured to fit behind the stairs in a compact form. Generally, a hydrogen generating apparatus includes three main groups of components: electrolysis cells 36 in which hydrogen gas generation occurs from a electrolyte solution by an electrolysis process conducted through electrodes; auxiliary devices (some of which are shown at 38) for controlling apparatus operation, for gas treatment, for controlling the characteristics of the conveyed gas, for mounting components, etc.; and conduits (a portion of which are shown at 40) for conducting generated gas from the cells to the engine. In many embodiments, a hydrogen generating apparatus housing 30a may contain cells 36 and at least a portion of the devices 38 and conduits 40 for the overall apparatus. In one embodiment to permit a compact form and to shape the apparatus for integration to vehicle stairs, cells 36 may be installed to form a lower portion of the apparatus and some of the auxiliary devices 38 are mounted on top of cells 36. Devices 38, may include, for example, any or all of a pressure switch 38a, a filter 38b, a flame arrestor, a controller, a power converter, a heater, an electrical bracket 38c, an electrical cover 38d including control panel 132, etc.

The lower portion of the apparatus may include an upper facing surface above the cells, the upper facing surface may include side edges extending between a front edge and a back edge. Devices 38 may be mounted together on one side of the upper facing surface to form an open area, indicated by phantom lines 44. The open area may be defined as that area between the mounted position of devices 38 and the front edge of the upper facing surface. Open area 44 has few if any components mounted thereabove. For example, in the illustrated embodiment of FIG. 5B, only a fastener protrudes above the upper surface of the lower portion in the open area. With this mounting arrangement wherein devices 38 are mounted on top of the cells, the plan area of the apparatus is reduced over an apparatus where the devices are mounted beside the cells, and the housing 130, 30a of the apparatus need only define a height Hi at one end which includes substantially only the height of cells 36 including their containers and mounting and access components. For example, in the illustrated embodiment of FIGS. 5A and 5B, the hydrogen generating cell containers are each formed from side walls 46c mounted between base 46a and a top plate 46b. Side walls 46c may be formed from a tube and the side walls may be sealed at one end in a recess 46d (FIG. 8) in base 46a and sealed at an opposite end in a recess formed in top plate 46b. The other higher side of the apparatus housing, which includes devices 38 mounted above the cells, defines a height H2 greater than height H1. This height change permits the side of the apparatus with the lower height, that with open area 44, to be fit under a step, such as a step 14d (or step 14b in FIG. 1), while the higher side of the apparatus, that with devices 38 installed above cells 36, can be installed under a higher step, such as a step 14e (or step 14c in FIG. 1), in the stairs.

To ensure that open area 44 remains open, any connection points, such as recesses 45a, fastener apertures 45b and ports 45c, can be maintained to one side of top plate 46b and as much as possible away from the open area.

The conduits 40 may be positioned about the cells, through mounting components 46a, 46b, between the devices, etc. as may be desired. However, it is beneficial to maintain the conduits close to the other components to reduce the overall size of the apparatus. In one embodiment, conduits may be formed through, as by drilling or forming, mounting and access components 46a, 46b. In the illustrated embodiment, for example, some conduits, which cannot be seen, for passage of generated hydrogen gas are formed through top plate 46b. Such conduits extend from cells 36 to a port 45c opening to pressure switch 38a, from which conduit 40 extends to filter 38b.

In the illustrated embodiment of FIG. 4, housing 30a may be included about the hydrogen generating apparatus internal components to protect them. Housing 30a may cover hydrogen generating cells 36, auxiliary devices 38 and open area 44. The housing may form an elevated surface over the auxiliary devices and extends down, for example via a wall 50, to a lower surface covering open area 44 such that the housing defines first height H1 over the open area and second elevated height H2 over the auxiliary devices. The height change renders the housing with a stepped form. In the illustrated embodiment of FIG. 4, wall 50 is substantially vertical and steps 14e and 14f are formed integral with housing, as by forming, fastening, welding, etc. such that the housing itself forms the vehicle stairs. Wall 50 can include an access door 34a, if desired.

The housing of a hydrogen generating apparatus may be removably or permanently mounted to the stairs, such as to the frame of the stairs or to another part of the motor vehicle in various ways. A reality of the use of such hydrogen generating systems is that they undergo significant vibration when on the vehicle. It has been determined that such vibration may cause premature component failure in a hydrogen generating system. Thus, component connectors may be used in the hydrogen generating apparatus that include a structural fastening member and a shock absorbing member in association with the structural fastening member to damp vibration from the vehicle to the hydrogen generating components. The structural fastening member and the shock absorbing member may act between a first member of the apparatus and a second member on any of the apparatus, vehicle stair or vehicle. For example, in one embodiment it may be useful to provide a shock absorbing means when mounting the housing to damp apparatus 128 from some vehicle vibration. In another embodiment, a combination of a structural fastening member and a shock absorbing member may be used for securing components within the hydrogen generating apparatus.

Figure 6A:
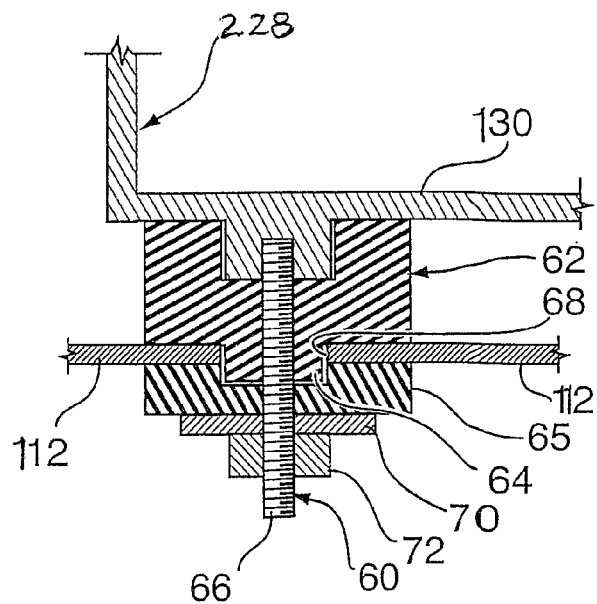
FIG. 6A is a sectional view through a mounting configuration useful in the present invention and for hydrogen generating apparatus generally.

With reference to FIG. 6A, in one embodiment a mounting configuration may be used that includes a structural fastening member 60 securing between housing 130 of an apparatus 228 and the point of installation, in this case frame 112, and a shock absorbing member 62 disposed between housing 130 and the point of installation. The shock absorbing member may be positioned adjacent or about the structural fastening member. In the illustrated embodiment, shock absorbing member 62 is positioned as an elastomeric sleeve about the structural fastening member to act between housing 130 and frame 112. Also, in the presently illustrated embodiment, shock absorbing member 62 includes an extension 64 acting between frame 112 and structural fastening member 62 to also absorb shock therebetween.

Structural fastening member 60 is formed to secure housing 130 to frame 112 even without the use of the shock absorbing member such that should the shock absorbing member become deteriorated or break away, housing 130 will remain connected to the point of installation. For example in the illustrated embodiment, structural fastening member 60 includes a steel bolt 66 connected, as by threaded engagement, welding etc. to housing 130. Bolt 66 extends through an aperture 68 in frame 112 and a washer 70 and bolt 72 are threaded onto the end of bolt 66 to secure it through aperture 68. A rubber washer 65 provides further shock absorption between washer 70 and frame 112.

Of course, shock absorbing member 62 and washer 65 could be formed as a one piece item, if desired, although installation may be more difficult than the multiple piece configuration as shown.

Figure 6B:
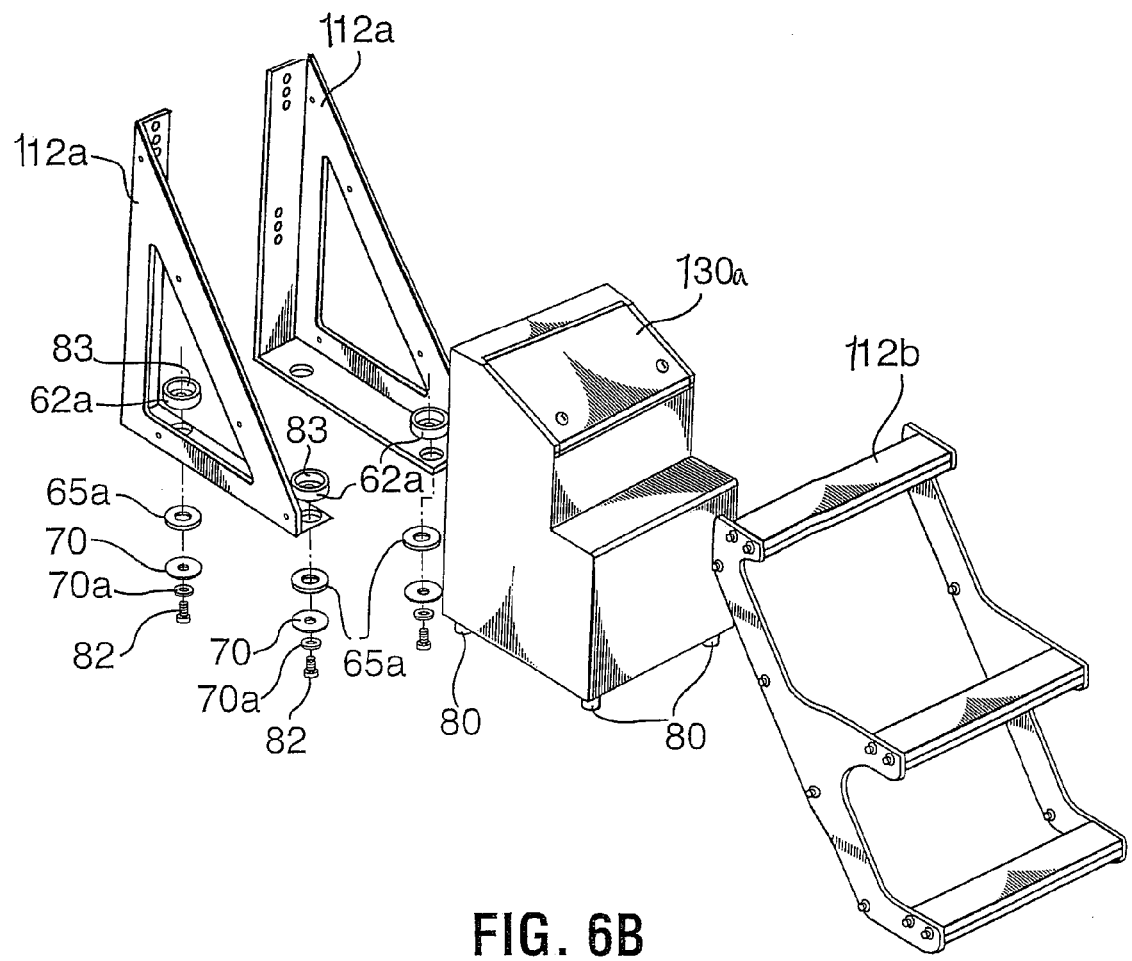
FIG. 6B is an exploded perspective view showing an installation option useful in the present invention and for hydrogen generating apparatus generally.

In another embodiment illustrated in FIG. 6B, a housing 130a may include a plurality of external legs 80 secured thereto, as by each including a bolt passing through an aperture in the housing (cannot be seen in any view) and engaging the leg. To secure the housing to stairs frame 112a, a lower bolt 82 may pass through washers 70, 70a, a shock absorbing rubber washer 65a and a shock absorbing rubber sleeve 62a before threading into each leg. The inner diameter 83 of rubber sleeve 62a may be formed frustoconically to, for example, facilitate insertion of leg 80 therein. In FIG. 6B, the housing has four legs attached but the shock absorbing and installation assembly for the back rear leg is omitted in the drawing for simplification.

Other apparatus components may also be benefited by installation with shock absorbing members. For example, FIGS. 7 and 8 illustrate such connections in the hydrogen generating apparatus.

Figure 7:
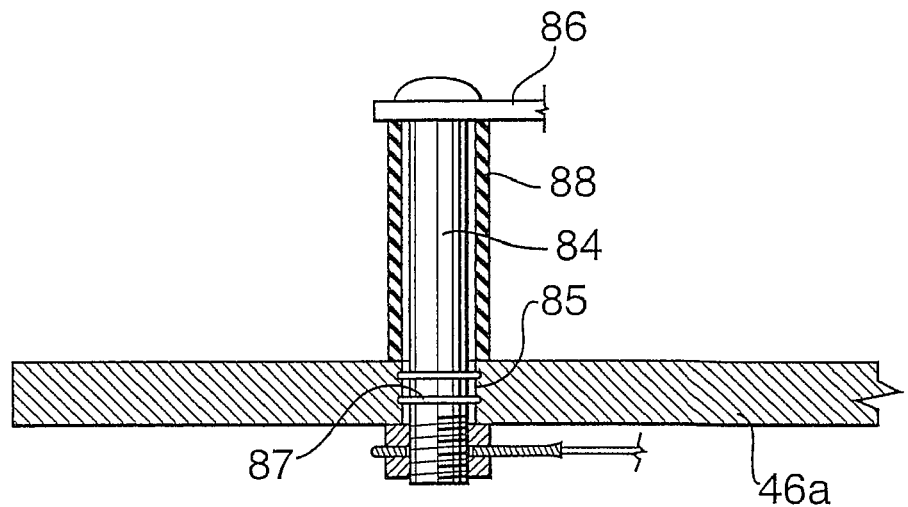
FIG. 7 is a schematic view of a component connector useful in the present invention and for hydrogen generating apparatus generally.

Referring to FIG. 7, the apparatus component may, for example, be an electrode terminal 84 connected between a portion of a cell and a portion of an electrode 86. In such an embodiment, terminal 84 may extend from a mounting position on the cell case to the electrode to thereby conduct electricity from a source to the electrode. In such an embodiment, the terminal at one end may extend through and have a mounting connection to the cell container such as base 46a and at its opposite end may be connected to electrode 86. Vibration in such an arrangement may either jeopardize the terminal's mount in the base, which may cause the terminal to become loosened from its mounting position through mounting port 85, may cause leakage between the terminal and the base past sealing rings 87. Alternately or in addition, vibration may cause the terminal to become disconnected from the electrode or may cause either or both of the terminal and the electrode to wear and fail adjacent the connection therebetween. A shock absorber 62a such as an elastomeric sleeve 88 may be positioned to damp vibration between the cell, the terminal and the electrode.

Figure 8:
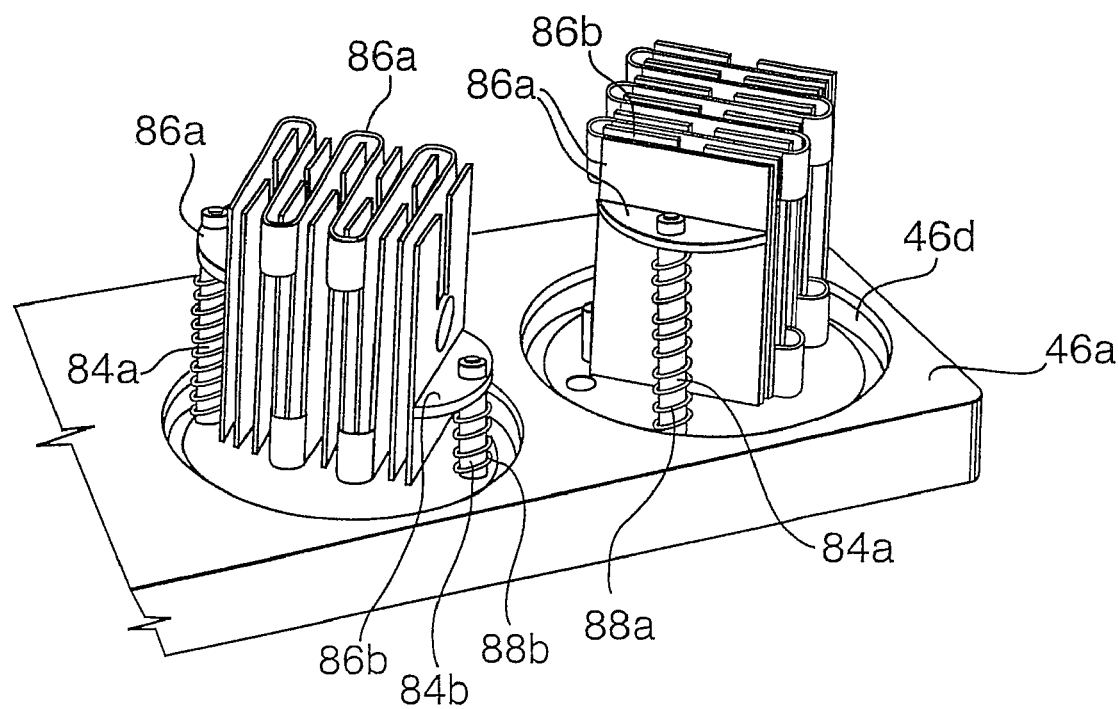
FIG. 8 is a perspective view of a pair of electrolysis electrode assemblies including electrode terminal connections according to one aspect of the present invention. The electrode assemblies are shown with their cell container sidewalls removed, but mounted on the cell's mounting base.

In such an embodiment, for example as shown in FIG. 8, a shock absorber may be positioned to damp vibration along the anode and cathode terminals. In the illustrated embodiment, springs 88a, 88b are positioned about terminals 84a, 84b to apply force axially outwardly at the two ends of the terminal. Springs 88a, 88b thus tend to hold their respective terminals in tension between their mount in the base and their connections to contact tabs from electrodes 86a, 86b to damp vibration of the terminals. Of course, while springs are shown, they could be replaced about or adjacent the terminal by an elastomeric sleeve or other member able to withstand extended contact with the electrolyte.

Although the present invention is illustrated through the specific example of a terminal connection, it is to be understood that the invention can be applied to other connections in a hydrogen generating apparatus that are susceptible to damage as a result of vibration. Such connections may include, for example, the connection between components in filter 38b, etc.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A hydrogen generating apparatus comprising: a hydrogen generating cell forming a lower portion of the apparatus; an auxiliary device mounted above the hydrogen generating cell and along one side of the apparatus; an open area above the hydrogen generating cells alongside the auxiliary device, the open area being substantially free of any auxiliary devices mounted thereon; and a housing covering the hydrogen generating cell, the auxiliary device and the open area, the housing extending over the auxiliary device and extending down to cover the open area such that the housing defines a first height over the open area and a second height over the auxiliary device, the first height being less than the second height wherein the housing includes a substantially vertical wall between the first height and the second height such that the housing has a stepped form.

2. The hydrogen generating apparatus of claim 1 wherein the lower portion includes a top plate and the top plate acts to support the mounting of the auxiliary device.

3. The hydrogen generating apparatus of claim 2 wherein the top plate includes a mounting structure for the auxiliary device, the mounting structure being positioned on one side of the top plate away from the open area.

4. The hydrogen generating apparatus of claim 1 wherein the hydrogen generating cell includes a side wall sealed at a bottom end into a base plate and sealed at an opposite end into a top plate and the top plate further acts to support the mounting of the auxiliary device.

5. The hydrogen generating apparatus of claim 4 wherein the top plate includes a mounting structure for the auxiliary device, the mounting structure being positioned on one side of the top plate away from the open area.

6. The hydrogen generating apparatus of claim 1 wherein the auxiliary device includes a filter for filtering generated gas from the hydrogen generating cell.

7. The hydrogen generating apparatus of claim 1 wherein the auxiliary device includes an electronics support bracket.

8. The hydrogen generating apparatus of claim 1 wherein the housing supports a vehicle step.

9. The hydrogen generating apparatus of claim 1 formed to fit behind a vehicle step.

10. The hydrogen generating apparatus of claim 9 wherein the housing at its first height is positioned under a step of vehicle stairs.

11. A hydrogen generating assembly comprising: stairs including a step; a hydrogen generating apparatus positioned behind the stairs such that the step of the stairs is exposed for use in front of the hydrogen generating apparatus, the stairs being adapted to permit access to the hydrogen generating apparatus; and a component connector acting between a first member and a second member, the component connector including a structural fastening member and a shock absorbing member in association with the structural fastening member to damp vibration from the first member to the second member.

12. The hydrogen generating assembly of claim 11 wherein the stairs are removable from over the hydrogen generating apparatus to permit access thereto.

13. The hydrogen generating assembly of claim 11 wherein the stairs include an opening there through to permit access to the hydrogen generating apparatus.

14. The hydrogen generating assembly of claim 11 wherein the stairs include a second step and the stairs includes an opening between the step and the second step to permit access to the hydrogen generating apparatus.

15. The hydrogen generating assembly of claim 11 wherein the stairs include a second step and the hydrogen generating apparatus includes a stepped shape including a first level sized to fit under the step and a second elevated level sized to fit under the second step.

16. The hydrogen generating assembly of claim 11 wherein the hydrogen generating apparatus includes a housing around at least one hydrogen generating cell and the housing is accessible through the stairs.

17. The hydrogen generating assembly of claim 16 wherein the housing includes an access door to a control panel.

18. The hydrogen generating assembly of claim 11 wherein the hydrogen generating apparatus is mounted between a stairs rear frame and a stairs front frame, the stairs front frame including the step.

19. The hydrogen generating assembly of claim 11 wherein the first member is a first portion of the hydrogen generating apparatus and the second member is a second portion of the hydrogen generating apparatus.

20. The hydrogen generating assembly of claim 11 wherein the first member is a portion of the hydrogen generating apparatus and the second member is a portion of the stairs.

* * * * *